US012786956B2

(12) United States Patent
Zhao et al.

(10) Patent No.: US 12,786,956 B2
(45) Date of Patent: Nov. 3, 2026

(54) METHOD FOR DETERMINING RESOURCE SET AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU); Shichang Zhang, Beijing (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 481 days.

(21) Appl. No.: 18/126,366

(22) Filed: Mar. 24, 2023

(65) Prior Publication Data

US 2023/0232375 A1 Jul. 20, 2023

Related U.S. Application Data

(63) Continuation of application No. PCT/CN2020/117917, filed on Sep. 25, 2020.

(51) Int. Cl.
*H04W 72/02* (2009.01)
*H04W 72/541* (2023.01)
(Continued)

(52) U.S. Cl.
CPC ......... *H04W 72/02* (2013.01); *H04W 72/541* (2023.01); *H04W 72/566* (2023.01); *H04W 72/25* (2023.01)

(58) Field of Classification Search
CPC . H04W 72/02; H04W 72/541; H04W 72/566; H04W 72/40; H04W 72/25; H04W 72/04; H04W 4/46
See application file for complete search history.

(56) References Cited

U.S. PATENT DOCUMENTS 11,082,954 B2 * 8/2021 Huang .................. H04L 1/1819
12,284,669 B2 * 4/2025 Lu ....................... H04W 74/002
(Continued)

FOREIGN PATENT DOCUMENTS

CN 110167072 A 8/2019
CN 111278108 A 6/2020
(Continued)

OTHER PUBLICATIONS

The first Office Action and search report of corresponding Chinese application No. 202310316893.X, dated Jul. 19, 2024.
(Continued)

*Primary Examiner* — Shah M Rahman
(74) *Attorney, Agent, or Firm* — Ladas & Parry, LLP

(57) ABSTRACT

Embodiments of the present application provide a method for determining a resource set and a terminal device, which can avoid problems such as a hidden node, half-duplex and the like occurring in resource selection, thereby improving reliability of the resource selection. The method for determining a resource set includes: determining, by a first terminal device, a target resource set; sending, by the first terminal device, the target resource set to a second terminal device, or sending, by the first terminal device, first indication information to a second terminal device according to the target resource set; where the target resource set is used for the second terminal device to determine a candidate transmission resource, and the first indication information is used for indicating the second terminal device to perform resource reselection.

15 Claims, 8 Drawing Sheets

(51) Int. Cl.
*H04W 72/566* (2023.01)
*H04W 72/25* (2023.01)

(56) References Cited

U.S. PATENT DOCUMENTS

| | | | | |
|---|---|---|---|---|
| 2018/0049220 | A1* | 2/2018 | Patil | H04L 5/0062 |
| 2020/0015136 | A1 | 1/2020 | Damnjanovic et al. | |
| 2020/0229171 | A1* | 7/2020 | Khoryaev | H04W 4/40 |
| 2020/0267523 | A1 | 8/2020 | Tang et al. | |
| 2020/0280961 | A1* | 9/2020 | Lee | H04W 4/40 |
| 2021/0045088 | A1 | 2/2021 | Cai et al. | |
| 2022/0030612 | A1* | 1/2022 | Balasubramanian | H04L 5/0053 |
| 2022/0039065 | A1* | 2/2022 | Yang | H04W 72/02 |
| 2022/0053460 | A1* | 2/2022 | Yu | H04W 72/56 |
| 2022/0232530 | A1* | 7/2022 | Chae | H04W 72/02 |
| 2022/0360409 | A1* | 11/2022 | Yang | H04W 72/20 |
| 2022/0369187 | A1* | 11/2022 | Ganesan | H04W 36/06 |
| 2023/0171738 | A1* | 6/2023 | Di Girolamo | H04W 72/02 370/329 |
| 2023/0292342 | A1* | 9/2023 | Lee | H04W 72/566 |
| 2025/0203646 | A1* | 6/2025 | Hui | H04W 72/542 |

FOREIGN PATENT DOCUMENTS

| | | | |
|---|---|---|---|
| CN | 111565405 | A | 8/2020 |
| WO | 2018184150 | A | 10/2018 |

OTHER PUBLICATIONS

International Search Report (ISR) dated Jun. 23, 2021 for Application No. PCT/CN2020/117917 and its English translation from WIPO.

Written Opinion (WOSA) dated Jun. 23, 2021 for Application No. PCT/CN2020/117917 and its English translation from WIPO.

LG Electronics, "WID revision: NR sidelink enhancement", RP-201385, 3GPP TSG RAN Meeting #88e RP-201385 Electronic Meeting, Jun. 29-Jul. 3, 2020, all pages.

Futurewei, "Views on resource allocation enhancements for sidelink communication", R1-2005296, 3GPP TSG RAN WG1 Meeting #102-e R1-2005296 eMeeting, Aug. 17-28, 2020, all pages.

Vivo, "Discussion on mode 2 enhancements", R1-2005404, 3GPP TSG RAN WG1 #102-e, e-Meeting, Aug. 17-28, 2020, all pages.

LG Electronics, "Discussion on feasibility and benefits for mode 2 enhancement", R1-2005749, 3GPP TSG RAN WG1 Meeting #102-e, e-Meeting, Aug. 17-28, 2020, all pages.

Lenovo, Motorola Mobility, "Sidelink resource allocation for Reliability enhancement", R1-2005840, 3GPP TSG RAN WG1 #102-e, E-meeting, Aug. 17-Aug. 28, 2020, all pages.

ZTE, Sanechips, "Inter-UE coordination in mode-2" , R1-2005961, 3GPP TSG RAN WG1 #102-e, e-Meeting, Aug. 17-28, 2020, all pages.

CMCC, "Discussion on reliability and latency enhancements for mode-2 resource allocation", R1-2006231, 3GPP TSG RAN WG1 #102-e, e-Meeting, Aug. 17-28, 2020, all pages.

Ericsson, "Feasibility and benefits of mode 2 enhancements for inter-UE coordination", R1-2006445, 3GPP TSG-RAN WG1 Meeting #102-e, e-Meeting, Aug. 17-28, 2020, all pages.

NTT Docomo, Inc., "Discussion on sidelink resource allocation for reliability and latency enhancements", R1-2006748, 3GPP TSG RAN WG1 #102, e-Meeting, Aug. 17-28, 2020, all pages.

Qualcomm Incorporated , "Reliability and Latency Enhancements for Mode 2", R1-2006829, 3GPP TSG RAN WG1 Meeting #102-e, Aug. 17-28, 2020, all pages.

Robert Bosch GmbH, "Sidelink Resource Allocation Enhancements", R1-2006876, 3GPP TSG RAN WG1 #102-e, E-Meeting, Aug. 17-28, 2020, all pages.

Intel Corporation, "Design of Resource Allocation Mode-2 for NR V2X Sidelink", R1-1912205, 3GPP TSG RAN WG1 Meeting #99, Reno, USA, Nov. 18-22, 2019.

Fraunhofer HHI, Fraunhofer IIS, "Resource Allocation Enhancements for Mode 2", R1-2005537, 3GPP TSG RAN WG1 Meeting #102-e e-Meeting, Aug. 17-28, 2020.

Moderator (LG Electronics) , "Summary for AI 8.11.2.2 Feasibility and benefits for mode 2 enhancements", R1-2007412, #3GPP TSG RAN WG1 #102-e, e-Meeting, Aug. 17-28, 2020.

The Extended European Search Report of corresponding European application No. 20954628.2, dated Sep. 25, 2023.

The second Office Action of corresponding Chinese application No. 202310316893.X, dated Nov. 29, 2024.

The Rejection Decision of corresponding Chinese patent application No. 202310316893.X, dated May 7, 2025.

* cited by examiner

METHOD FOR DETERMINING RESOURCE SET AND TERMINAL DEVICE

CROSS-REFERENCE TO RELATED APPLICATIONS

This application is a continuation of International Application No. PCT/CN2020/117917, filed on Sep. 25, 2020, the content of which is hereby incorporated by reference in its entirety.

TECHNICAL FIELD

Embodiments of the present application relate to the field of communications and, in particular, to a method for determining a resource set and a terminal device.

BACKGROUND

In a new radio vehicle to everything (NR-V2X) system, a terminal device can select transmission resources in a resource pool randomly, or the terminal device can select transmission resources in a resource pool according to listening results.

SUMMARY

Embodiments of the present application provide a method for determining a resource set and a terminal device.

In a first aspect, a method for determining a resource set is provided, and the method includes:

- determining, by a first terminal device, a target resource set;
- sending, by the first terminal device, the target resource set to a second terminal device, or sending, by the first terminal device, first indication information to a second terminal device according to the target resource set;
- where the target resource set is used for the second terminal device to determine a candidate transmission resource, and the first indication information is used for indicating the second terminal device to perform resource reselection.

In a second aspect, a method for determining a resource set is provided, and the method includes:

- receiving, by a second terminal device, a target resource set sent by a first terminal device, or receiving, by a second terminal device, first indication information sent by a first terminal device according to a target resource set;
- where the target resource set is used for the second terminal device to determine a candidate transmission resource, and the first indication information is used for indicating the second terminal device to perform resource reselection.

In a third aspect, a terminal device is provided and is configured to execute the method in the first aspect.

Specifically, the terminal device includes functional modules configured to execute the method in the first aspect.

In a fourth aspect, a terminal device configured to execute the method in the second aspect is provided.

Specifically, the terminal device includes functional modules configured to execute the method in the second aspect.

In a fifth aspect, a terminal device including a processor and a memory is provided. The memory is configured to store a computer program, and the processor is configured to call and run the computer program stored in the memory, so as to execute the method in the first aspect.

In a sixth aspect, a terminal device including a processor and a memory is provided. The memory is configured to store a computer program, and the processor is configured to call and run the computer program stored in the memory, so as to execute the method in the second aspect.

In a seventh aspect, an apparatus configured to implement the method in any one of the first aspect and the second aspect described above is provided.

Specifically, the apparatus includes: a processor, configured to call and run a computer program from a memory, so that a device equipped with the apparatus executes the method in any one of the first aspect and the second aspect described above.

In an eighth aspect, a computer-readable storage medium for storing a computer program is provided, where the computer program causes a computer to execute the method in any one of the first aspect and the second aspect described above.

In a ninth aspect, a computer program product including computer program instructions is provided, where the computer program instructions cause a computer to execute the method in any one of the first aspect and the second aspect described above.

In a tenth aspect, a computer program is provided, where the computer program causes a computer to execute the method in any one of the first aspect and the second aspect described above when run on the computer.

DESCRIPTION OF EMBODIMENTS

Figure 1:
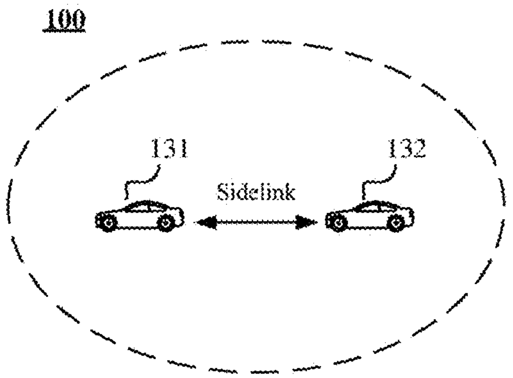
FIG. 1 is a schematic diagram of architecture of a communication system provided by an embodiment of the present application.

The following describes technical solutions in embodiments of the present application with reference to accompanying drawings in the embodiments of the present application. Apparently, the described embodiments are merely a part rather than all of the embodiments of the present application. Other embodiments obtained by persons of ordinary skill in the art based on the embodiments of the present application without creative efforts shall all belong to the protection scope of the present application.

The technical solutions of the embodiments of the present application may be applied to various communication systems, such as a global system of mobile communication (GSM), a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a non-terrestrial networks (NTN) system, a universal mobile telecommunication system (UMTS), wireless local area networks (WLAN), wireless fidelity (WiFi), a 5-th generation communication (5-th Generation, 5G) system or other communication systems, etc.

Generally, a quantity of connections supported by a conventional communication system is limited, and is easy to be implemented. However, with the development of communication technology, a mobile communication system will not only support traditional communication, but also support device-to-device (D2D) communication, machine-to-machine (M2M) communication, machine-type communication (MTC), vehicle-to-vehicle (V2V) communication, or vehicle-to-everything (V2X) communication, etc. The embodiments of the present application may also be applied to these communication systems.

In an implementation, the communication system in the embodiments of the present application may be applied to a scenario of carrier aggregation (CA), may also be applied to a scenario of dual connectivity (DC), and may also be applied to a scenario of standalone (SA) network deployment.

In an implementation, the communication system in the embodiments of the present application may be applied to an unlicensed spectrum, where the unlicensed spectrum may also be considered as a shared spectrum. Or, the communication system in the embodiments of the present application may also be applied to a licensed spectrum, where the licensed spectrum may also be considered as a non-shared spectrum.

The embodiments of the present application describe various embodiments in conjunction with a network device and a terminal device, where the terminal device may also be referred to as a user equipment (UE), an access terminal, a user unit, a user station, a mobile station, a mobile radio station, a remote station, a remote terminal, a mobile device, a user terminal, a terminal, a wireless communication device, a user agent, or a user apparatus, etc.

The terminal device may be a station (ST) in the WLAN, and may be a cellular phone, a cordless phone, or a session initiation protocol (SIP) phone, a wireless local loop (WLL) station, a personal digital assistant (PDA) device, a handheld device having a wireless communication function, a computing device having a wireless communication function or other processing devices connected to a wireless modem, an in-vehicle device, a wearable device, a terminal device in a next generation communication system such as in an NR network, or a terminal device in a future evolved public land mobile network (PLMN), etc.

In the embodiments of the present application, the terminal device may be deployed on land, including indoor or outdoor, handheld, wearable, or vehicle-mounted; may also be deployed on a water surface (e.g., a ship, etc.); and may also be deployed in the air (e.g., on an airplane, a balloon, and a satellite, etc.).

In the embodiments of the present application, the terminal device may be a mobile phone, a tablet computer (Pad), a computer with a wireless transceiving function, a virtual reality (VR) terminal device, an augmented reality (AR) terminal device, a wireless terminal device in industrial control, a wireless terminal device in self driving, a remote medical wireless terminal device, a wireless terminal device in smart grid, a wireless terminal device in transportation safety, a wireless terminal device in a smart city, or a wireless terminal device in a smart home, etc.

As an example rather than a limitation, in the embodiments of the present application, the terminal device may also be a wearable device. The wearable device may also be referred to as a wearable smart device, and is a general term of wearable devices that are developed by performing intelligent design on daily wear using wearable technology, such as glasses, gloves, watches, clothes, shoes, etc. The wearable device is a portable device that is either worn directly on the body or integrated into a user's clothing or accessories. The wearable device is not only a hardware device, but also realizes powerful functions through software support, data interaction, and cloud interaction. In a broad sense, wearable smart devices include those full-featured and large-sized with complete or partial functions being achieved without depending on a smartphone, such as smart watches, smart glasses or the like, and those focusing on only a certain type of application functions and required to be used in combination with other devices such as a smartphone, such as various types of smart bracelets, smart jewelry and the like for physical signs monitoring.

In the embodiments of the present application, the network device may be a device for communicating with a mobile device. The network device may be an access point (AP) in the WLAN, a base station (Base Transceiver Station, BTS) in the GSM or CDMA, a base station (Node B, NB) in the WCDMA, an evolutional base station (Evolutional Node B, eNB or eNodeB) in the LTE, a relay station or access point, a vehicle-mounted device, a wearable device, a network device or a base station (a gNB) in an NR network, a network device in a future evolved PLMN network, or a network device in an NTN network, etc.

As an example rather than a limitation, in the embodiments of the present application, the network device may have a mobile characteristic, for example, the network device may be a mobile device. In an implementation, the network device may be a satellite or a balloon station. For example, the satellite may be a low earth orbit (LEO) satellite, a medium earth orbit (MEO) satellite, a geosynchronous earth orbit (GEO) satellite, a high elliptical orbit (HEO) satellite, etc. In an implementation, the network device may also be a base station disposed at a location such as a land, a water area and the like.

In the embodiments of the present application, the network device can provide a service for a cell, and the terminal device communicates with the network device through transmission resources (for example, frequency domain resources, in other words, spectrum resources) used by the cell. The cell may be a cell corresponding to the network device (for example, a base station). The cell may belong to a macro base station, and may also belong to a base station corresponding to a small cell, where the small cell here may include a metro cell, a micro cell, a pico cell, a femto cell, etc. These small cells have the characteristics of small coverage and low transmission power, and are suitable for providing a high-rate data transmission service.

It should be understood that, the terms “system” and “network” herein are often used interchangeably herein. The term “and/or” herein only describes an association relationship for describing associated objects, and represents that there may exist three relationships. For example, “A and/or B” may represent three cases: A exists alone, A and B exist at the same time, and B exists alone. In addition, the character “/” herein generally indicates that the associated objects before and after the character are of an “or” relationship.

The terms used in the implementations of the present application are only used to explain specific embodiments of the present application, and are not intended to limit the present application. In the description, claims and drawings of the present application, the terms “first”, “second”, “third”, “fourth” and the like are only used for distinguishing different objects, and are not used for describing a specific order. In addition, the terms “including”, “having” and any variation thereof are intended to cover a non-exclusive inclusion.

It should be understood that, “indication” mentioned in the embodiments of the present application may be a direct indication, an indirect indication, or represent having an association relationship. For example, “A indicates B” may mean that A indicates B directly, for example, B can be obtained through A; may also mean that A indicates B indirectly, for example, A indicates C, and B can be obtained through C; and may also mean that there is an association relationship between A and B.

In the description of the embodiments of the present application, the term “corresponding” may represent that there is a direct correspondence or indirect correspondence between the two, may also represent that there is an association relationship between the two, and may also represent that there is a relationship of indicating and being indicated, of configuring and being configured, etc.

FIG. 1 is a schematic diagram of a communication system 100 to which an embodiment of the present application is applicable. Vehicle-mounted terminals (a vehicle-mounted terminal 131 and a vehicle-mounted terminal 132) select transmission resources for data transmission from sidelink resources autonomously. In an implementation, the vehicle-mounted terminals may select transmission resources randomly, or select transmission resources by means of listening.

Figure 2:
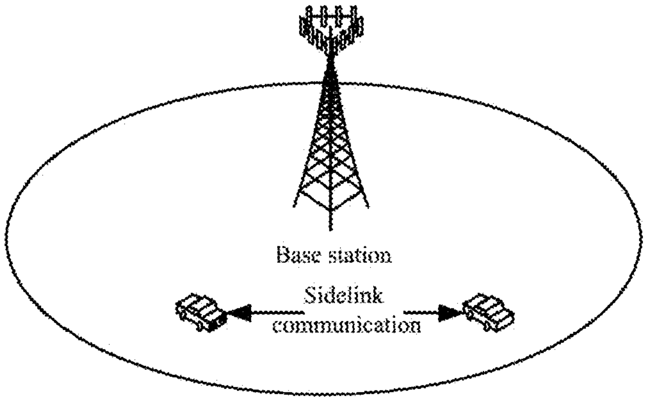
FIG. 2 is a schematic diagram of sidelink communication within network coverage according to the present application.
Figure 3:
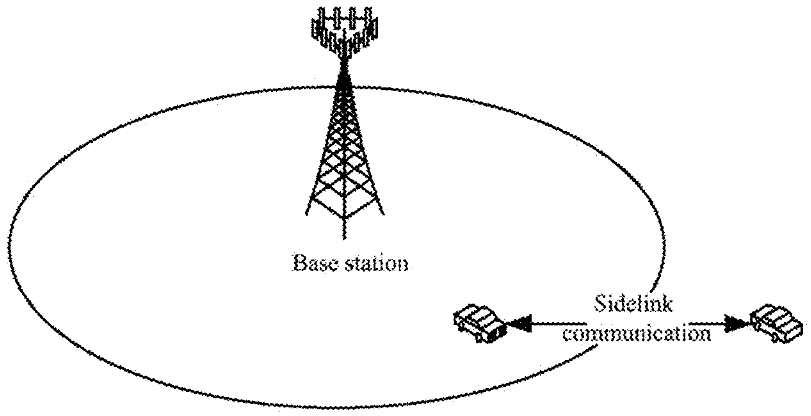
FIG. 3 is a schematic diagram of sidelink communication with partial network coverage of a according to the present application.
Figure 4:
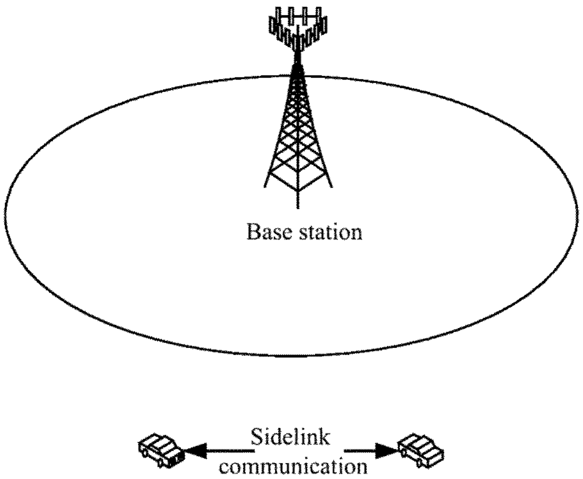
FIG. 4 is a schematic diagram of sidelink communication outside network coverage according to the present application.

It should be noted that in sidelink communication, according to the condition of network coverage where terminals performing communication are located, the sidelink communication may be divided into sidelink communication within network coverage, as shown in FIG. 2; sidelink communication with partial network coverage, as shown in FIG. 3; and sidelink communication outside network coverage, as shown in FIG. 4.

FIG. 2: In the sidelink communication within network coverage, all terminals performing sidelink communication are within coverage of the same base station, so that the terminals can perform sidelink communication based on the same sidelink configuration through receiving configuration signaling from the base station.

FIG. 3: In a case of the sidelink communication with partial network coverage, part of terminals performing sidelink communication are located within coverage of a base station, and this part of terminals can receive configuration signaling from the base station and perform sidelink communication according to the configuration of the base station. However, a terminal located outside network coverage cannot receive configuration signaling of the base station. In this case, the terminal outside network coverage will determine sidelink configuration according to pre-configuration information and information carried in a physical sidelink broadcast channel (PSBCH) sent by the terminal located within network coverage, so as to perform the sidelink communication.

FIG. 4: For the sidelink communication outside network coverage, all terminals performing sidelink communication are located outside network coverage, and all terminals determine sidelink configuration according to pre-configuration information, so as to perform the sidelink communication.

It should be noted that, device to device communication is sidelink (SL) transmission technology based on device to device (D2D), which is different from a manner of receiving or sending communication data through a base station in a traditional cellular system, and which therefore has higher spectrum efficiency and lower transmission latency. A system for vehicle to everything adopts a manner of device to device direct communication, and two transmission modes are defined in 3GPP, which are respectively denoted as a first mode and a second mode. The embodiments of the present application may be applied to the second mode.

First mode: Transmission resources for a terminal are allocated by a base station, and the terminal sends data on a sidelink according to the resources allocated by the base station. The base station may allocate resources of a single transmission to the terminal, and may also allocate semi-persistent transmission resources to the terminal. As shown in FIG. 2, the terminal is located within network coverage, and the network allocates to the terminal transmission resources used for sidelink transmission.

Second mode: A terminal selects one resource from a resource pool to perform data transmission. As shown in FIG. 4, the terminal is located outside coverage of a cell, and the terminal selects a transmission resource from a pre-configured resource pool autonomously to perform sidelink transmission. Or, as shown in FIG. 2, the terminal autonomously selects a transmission resource from a resource pool configured by a network to perform sidelink transmission.

It should be noted that, in the NR-V2X, a user may be in a mixed mode. That is, acquisition of resources can be performed by using the first mode, and can also be performed by using the second mode.

In the NR-V2X, automatic driving is supported, and thus higher requirements are put forward for data interaction between vehicles, such as higher throughput, lower latency, higher reliability, larger coverage, more flexible resource allocation, etc.

Figure 5:
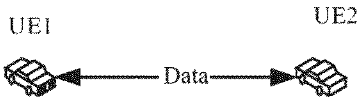
FIG. 5 is a schematic diagram of unicast sidelink communication according to the present application.
Figure 6:
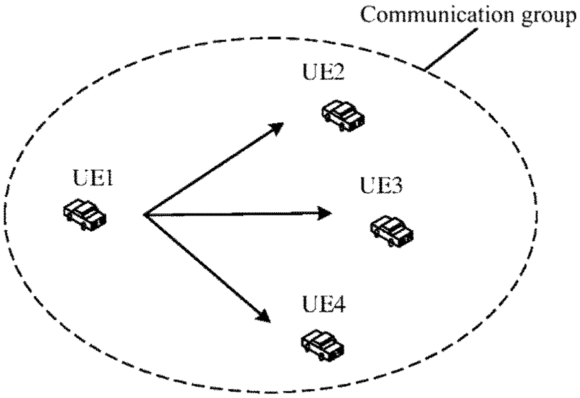
FIG. 6 is a schematic diagram of multicast sidelink communication according to the present application.
Figure 7:
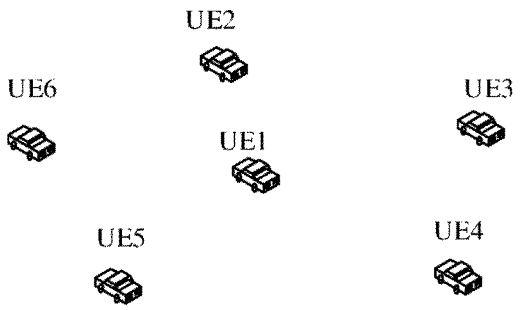
FIG. 7 is a schematic diagram of broadcast sidelink communication according to the present application.

In long term evolution vehicle to everything (LTE-V2X), a broadcast transmission manner is supported, and in the NR-V2X, unicast and multicast transmission manners are introduced. With regard to the unicast transmission, a receiving terminal thereof has only one terminal. As shown in FIG. 5, the unicast transmission is performed between UE1 and UE2. With regard to the multicast transmission, receiving ends thereof are all terminals within a communication group, or all terminals within a certain transmission distance. As shown in FIG. 6, UE1, UE2, UE3 and UE4 constitute a communication group, where UE1 sends data, and other terminal devices within the group are receiving terminals. With regard to the broadcast transmission manner, a receiving end thereof is any terminal around a sending terminal. As shown in FIG. 7, UE1 is a sending terminal, and other terminals around the sending terminal, i.e., UE2 to UE6, are receiving terminals.

A resource pool is introduced into a sidelink transmission system, and the so-called resource pool is a set of transmission resources. Both a transmission resource configured by a network and a transmission resource autonomously selected by a terminal are resources in the resource pool. The resource pool may be configured by means of pre-configuration or network configuration, and one or more resource pools may be configured. The resource pool is further divided into a sending resource pool and a receiving resource pool. The sending resource pool means that transmission resources in this resource pool are used for sending sidelink data, while the receiving resource pool means that a terminal receives sidelink data on transmission resources in this resource pool.

Figure 8:
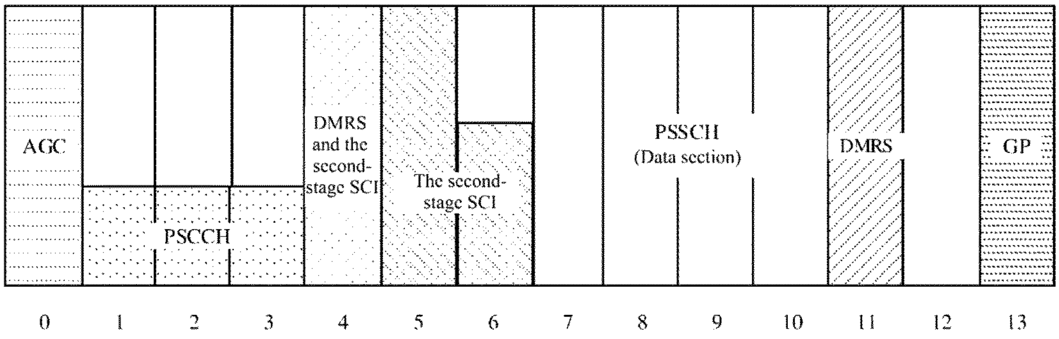
FIG. 8 is a schematic diagram of a frame structure of a PSCCH and a PSSCH according to the present application.

Two-stage sidelink control information (SCI) is introduced in the NR-V2X. First-stage SCI is carried in a physical sidelink control channel (PSCCH), and is used for indicating information such as transmission resources of a physical sidelink shared channel (PSSCH), information about reserved resources, a level of a modulation and coding scheme (MCS), a priority, etc. Second-stage SCI is sent in a resource of the PSSCH, is demodulated using a demodulation reference signal (DMRS) of the PSSCH, and is used for indicating information for data demodulation, such as an identity (ID) of a sending end (which may also be referred to as a source identity), an ID of a receiving end (which may also be referred to as a destination ID), an ID of a hybrid automatic repeat request (HARQ), a new data indicator (NDI), etc. The first symbol is typically used as auto gain control (AGC), the PSCCH starts from the second symbol of a slot, and the last symbol is used as a guard period (GP). The second-stage SCI is mapped starting from the first DMRS symbol of the PSSCH, and is mapped firstly in a frequency domain and then in a time domain. As shown in FIG. 8, the PSCCH occupies three symbols (symbol 1, symbol 2 and symbol 3), and the DMRS of the PSSCH occupies symbol 4 and symbol 11. The second-stage SCI is mapped starting from symbol 4, and is frequency-division-multiplexed with the DMRS on symbol 4. The second-stage SCI is mapped to symbol 4, symbol 5 and symbol 6, and the size of resources occupied by the second-stage SCI depends on a quantity of bits of the second-stage SCI.

In the transmission manner of the above second mode, the terminal device selects a transmission resource from a resource pool randomly, or selects a transmission resource according to a listening result. Such resource selection manners can avoid interference between terminals to some extent, but also has the following problems.

Figure 9:
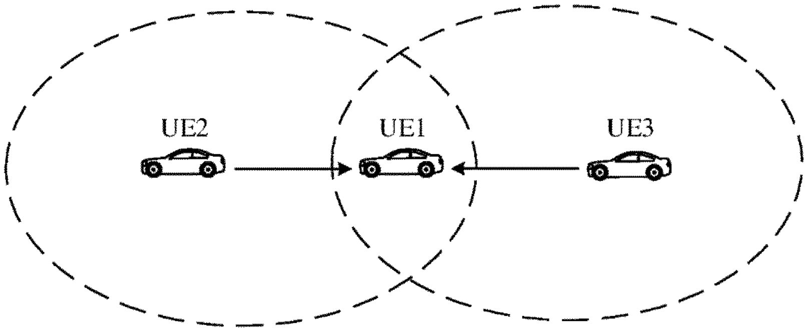
FIG. 9 is a schematic diagram of a hidden node according to the present application.

1. Hidden node: As shown in FIG. 9 below, UE2 selects a resource according to listening, and sends sidelink data to UE1 by using the resource. Since UE2 and UE3 are far away from each other and cannot listen transmission of the other, UE2 and UE3 may select the same transmission resource, and data sent by UE3 may cause interference to data sent by UE2, which is a hidden node problem.

2. Half-duplex problem: When a terminal selects a transmission resource through listening, if the terminal sends sidelink data in a certain slot within a listening window, due to a half-duplex constraint, the terminal cannot receive data sent by other terminals in this slot, and then there is no listening result. Therefore, when performing resource exclusion, the terminal will exclude all the resources corresponding to this slot within a selection window, to avoid interference with other terminals. The half-duplex constraint will result in that the terminal excludes many resources that do not need to be excluded. In addition, since the terminal sends data in this slot, if another terminal also selects the same resource in this slot to send data, the two terminals cannot determine, due to the half-duplex constraint, that a resource conflict exists, which will cause a continuous resource conflict between the two terminals.

Due to the problem existing in the process of the resource selection in the above second mode, an enhanced resource selection solution is proposed. On the basis of the above described manner, a resource set can also be sent to another terminal (UE2) by one terminal (UE1), for UE2 to perform resource selection. The resource set may be, for example, the following information.

Resource set: The resource set is an available resource set. UE1 obtains an available resource set according to listening results, and sends the resource set to UE2. When UE2 performs resource selection for sidelink data sent to UE1, UE2 can select a resource from the available resource set, thereby improving reliability of UE1 receiving the sidelink data. Or, the resource set may also be an unavailable resource set. UE1 reports the resource set to UE2, and UE2 avoids selecting resources in the resource set as far as possible when performing resource selection.

Specific transmission resource: Information sent by UE1 to UE2 includes a specific transmission resource, and UE2 uses this transmission resource to send sidelink data to UE1, which is now equivalent to that UE1 allocates a sidelink transmission resource for UE2.

That is to say, in the above described resource allocation manner, the terminal device needs to combine a resource set sent by other terminals in the process of resource selection, thereby improving reliability of transmission.

However, in the above described enhanced resource selection solution, UE1 sends a resource set to UE2 so as to assist UE2 in resource selection. However, how UE1 determines the resource set to avoid the above described problems such as a half-duplex problem, a hidden node and the like needs to be solved.

In view of the above described problems, the present application proposes a solution for determining a resource set. The resource set can be determined, and problems such as a hidden node, half-duplex and the like can be avoided in resource selection, thereby improving reliability of the resource selection.

The technical solutions of the present disclosure will be described in detail hereinafter with reference to specific embodiments.

Figure 10:
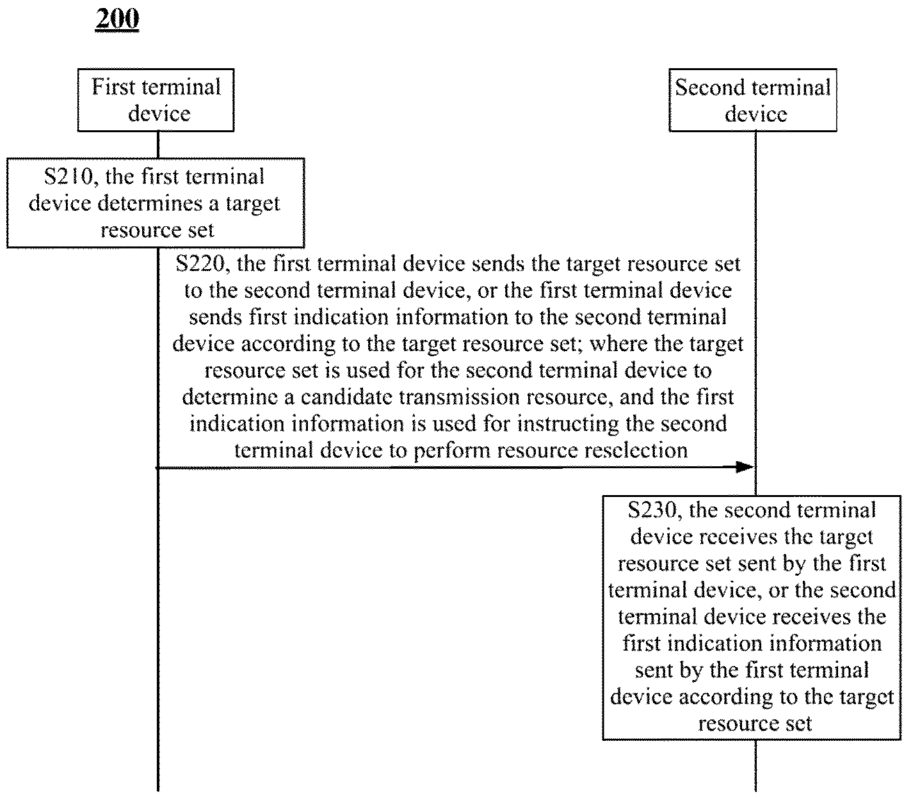
FIG. 10 is a schematic flowchart of a method for determining a resource set according to an embodiment of the present application.

FIG. 10 is a schematic flowchart of a method 200 for determining a resource set according to an embodiment of the present application. As shown in FIG. 10, the method 200 may include at least some of the following contents.

S210: a first terminal device determines a target resource set.

S220: the first terminal device sends the target resource set to a second terminal device, or the first terminal device sends first indication information to a second terminal device according to the target resource set; where the target resource set is used for the second terminal device to determine a candidate transmission resource, and the first indication information is used for indicating the second terminal device to perform resource reselection.

S230: the second terminal device receives the target resource set sent by the first terminal device, or the second terminal device receives the first indication information sent by the first terminal device according to the target resource set.

In an implementation, the target resource set is specifically used for the second terminal device to determine a resource which needs to be excluded. Further, the target resource set is specifically used for determining the resource which needs to be excluded when the second terminal device performs resource selection. That is, a transmission resource in the target resource set is a transmission resource not recommended for the second terminal device, and when the second terminal device performs data transmission, the transmission resource in the target resource set should be avoided.

That is to say, in the embodiment of the present application, the terminal device can send transmission resources which may have a resource conflict or a half-duplex problem, or cause a problem of a conflict between sending and receiving of PSFCHs to other terminal devices, so that the other terminal devices avoid selecting these transmission resources, thereby avoiding problems such as a half-duplex problem, a hidden node and the like.

In an implementation, the second terminal device obtains the first indication information sent by the first terminal device, and determines, according to the first indication information, to perform resource reselection. For example, the first indication information is used for indicating that there is a resource conflict, or a half-duplex problem, or a problem of a conflict between sending and receiving of PSFCHs. When receiving the first indication information, the second terminal device determines to perform resource reselection, so as to avoid the resource conflict, or the half-duplex problem, or the problem of a conflict between sending and receiving of the PSFCHs.

In an implementation, the first terminal device may be a receiving device of sidelink data sent by the second terminal device. For example, when UE1 is a receiving device of sidelink data sent by UE2, UE1 may obtain a resource set according to listening, and determine whether there is a resource conflict for elements in the resource set, and whether a half-duplex problem will be caused in UE1.

In an implementation, the first terminal device may also be a terminal device within a communication group where the second terminal device is located. For example, UE1, UE2 and UE3 constitute a communication group. When a terminal performs multicast communication, all terminals within the group need to perform receiving. If UE1 detects that UE2 and UE3 will send sidelink data in the same slot, UE1 can send a resource set to UE2 and/or UE3, where the resource set includes information about the slot, so that UE2 and/or UE3 avoids using the slot to perform data transmission. Thus, a half-duplex problem between UE2 and UE3 can be avoided.

In an implementation, S210 may specifically be:

the first terminal device determines the target resource set according to first information;

where the first information includes at least one of the following:

a sidelink reference signal received power (RSRP) and/or a sidelink received signal strength indicator (RSSI) that is detected by the first terminal device;

a sidelink RSRP and/or a sidelink RSSI that is predicted by the first terminal device;

a transmission resource that is detected by the first terminal device and conflicts with a transmission resource reserved by the second terminal device;

a time domain resource occupied by data to be sent;

a time domain resource occupied by a PSFCH to be received;

a time domain resource occupied by a PSSCH corresponding to a time domain resource occupied by a PSFCH to be received;

a time domain resource occupied by a PSFCH to be sent;

a time domain resource occupied by a PSSCH corresponding to a time domain resource occupied by a PSFCH to be sent.

In an implementation, transmission resources in the target resource set have characteristics as described in detail in at least one of example 1 to example 5 below.

In example 1, a sidelink RSRP or a sidelink RSSI of a transmission resource in the target resource set exceeds a first threshold value.

For the sidelink RSRP, the first threshold value is an RSRP value; and for the sidelink RSSI, the first threshold value is an RSSI value.

It is assumed that UE1 performs resource listening, detects SCI of other users within a listening window, and performs sidelink RSRP measurements. If another user (such as UE3) reserves a transmission resource S (a resource for retransmission or for transmission of a next data block), and the detected sidelink RSRP is higher than the first threshold value, UE1 sends the resource S as an element in the target resource set to UE2. That is, UE1 considers that the resource S is already reserved by another terminal, and if UE2 uses the resource S, a transmission conflict with another terminal will be caused, which would reduce reliability of transmission. UE1 sends the resource S to UE2, and UE2 avoids selecting the resource S when selecting a transmission resource, thus, a hidden node problem can be avoided. That is, a transmission conflict, which is resulted from that UE2 cannot detect the transmission resource reserved by UE3 since UE2 and UE3 are far away from each other, and thus selects the resource S, is avoided. Such a problem can be avoided by UE1 sending the transmission resource reserved by UE3 to UE2.

Figure 11:
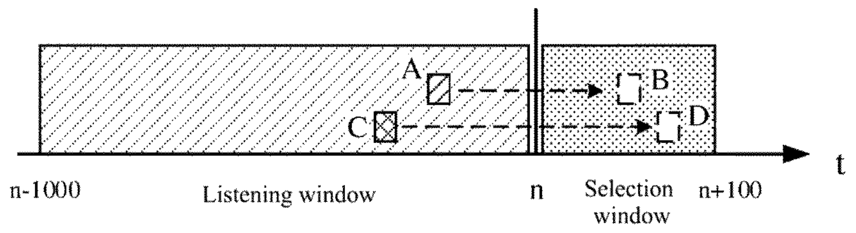
FIG. 11 is a schematic diagram of determining a resource set according to an embodiment of the present application.

For example, as shown in FIG. 11, UE1 performs resource listening and detects SCI sent by a certain terminal (such as UE3) on resource A within a listening window, and a sidelink RSRP exceeds the first threshold value. And UE3 reserves transmission resource B for use in the next period (such as after 100 ms). Then UE1 takes transmission resource B as a resource in the target resource set. When SCI sent by a certain terminal (such as UE4) on resource C is detected within the listening window, but a sidelink RSRP does not exceed the first threshold value, and UE 4 reserves transmission resource D for use in the next period (such as after 200 ms), then UE1 does not take transmission resource D as a resource in the target resource set. UE1 sends the target resource set (including transmission resource B) to UE2.

In an implementation, in example 1, the sidelink RSRP of the transmission resource in the target resource set is a predicted sidelink RSRP, or the sidelink RSSI of the transmission resource in the target resource set is a predicted sidelink RSSI.

For example, for resource A in FIG. 11, UE1 detects the SCI of UE3 on resource A, and resource B is reserved. UE1 will consider that UE3 will send sidelink data on resource B, and predicts that a sidelink RSRP on resource B is the same as the sidelink RSRP on resource A. Therefore, UE1 sends resource B to UE2, and UE2 can learn that there will be data transmission on resource B, and that the sidelink RSRP exceeds the first threshold value.

It should be noted that, the description of the sidelink RSSI is similar to the description of the sidelink RSRP, which will not be repeated here.

In an implementation, in example 1, the first threshold value is preconfigured or determined in specification, or the first threshold value is configured by a network device, or the first threshold value is configured by a third terminal device.

For example, preconfigured information includes the first threshold value; or, the first terminal device receives configuration information sent by the network device, where the configuration information includes the first threshold value; or, the first terminal device receives sidelink data sent by the third terminal device, where the sidelink data (including SCI, a media access control control element (MAC CE), a radio resource control (RRC) signaling based on a PC5 interface (PC5-RRC signaling), etc.) includes the first threshold value.

In an implementation, in example 1, the first threshold value is determined according to sidelink information sent by the second terminal device.

For example, when a connection is established between the first terminal device and the second terminal device, the second terminal device sends sidelink information to the first terminal device by means of a PC5-RRC signaling, where the sidelink information includes the first threshold value. For another example, the second terminal device sends sidelink information to the first terminal device through SCI, an MAC CE or the like, where the sidelink information includes the first threshold value. For another example, the first threshold value is included in a signaling that the second terminal device sends to the first terminal device to trigger the first terminal device to send the target resource set.

In an implementation, in example 1, the first threshold value is determined by the first terminal device. For example, when a connection is established between the first terminal device and the second terminal device, the first terminal device sends it to the second terminal device by means of a PC5-RRC signaling. For another example, the first terminal device sends the target resource set to the first terminal device, together with the first threshold value.

In an implementation, in example 1, the first threshold value is a value related to first priority information, or the first threshold value is determined according to first priority information.

In an implementation, the first priority information includes at least one of the following:

- a priority carried in SCI, a priority of a service corresponding to sidelink data, a priority of a logic channel corresponding to sidelink data.

In an implementation, in example 1, the first priority information is obtained from the second terminal device, or the first priority information is obtained from configuration information of a resource pool.

For example, when the first threshold value is preconfigured, or configured by the network device, the third terminal device or the second terminal device, the first threshold value is a parameter determined according to the first priority information. For example, corresponding first threshold values are configured for different priorities.

For example, the configuration information of the resource pool includes the first threshold value, and the configuration information of the resource pool may be preconfigured or configured by a network. The first threshold value is determined according to a priority, i.e., first threshold values are respectively configured for different priorities. When determining the target resource set, the first terminal device will determine the target resource set according to a priority, where the priority may be a preconfigured priority, or a priority that the second terminal device sends to the first terminal device. For example, when triggering the first terminal device to send the target resource set, the second terminal device sends priority information to the first terminal device. The first terminal device performs resource listening according to the priority, and determines a first threshold value corresponding to the priority. The first terminal device sends the target resource set which is determined according to the priority to the second terminal device.

For another example, the configuration information of the resource pool includes a priority, and the priority may be considered as a default priority. When performing resource listening, if the first terminal device does not determine a priority in other manners (for example, a priority is sent by the second terminal device to the first terminal device), the default priority is used for listening, and a first threshold value corresponding to the default priority is determined. The first terminal device will send a resource set determined according to the default priority to the second terminal device.

In an implementation, the first terminal device sends the first threshold value to the second terminal device.

For example, when the first threshold value is determined by the first terminal device, the first terminal device sends both the target resource set and the first threshold value to the second terminal device. The second terminal device can determine according to the first threshold value that RSRP values of transmission resources in the target resource set are all greater than the first threshold value, and can thus determine interference levels of the transmission resources in the target resource set.

In an implementation, the first terminal device sends the first priority information corresponding to the first threshold value to the second terminal device.

In example 2, a transmission resource in the target resource set is a transmission resource with a conflict.

For example, when sending sidelink data, UE2 will indicate a reserved transmission resource through SCI, where the transmission resource may be a transmission resource for retransmission of the current data block or a transmission resource for a next data block. If UE1 detects that the transmission resource reserved by UE2 conflicts with transmission resources reserved by other terminals (such as UE3), UE1 sends information about the transmission resource to UE2, and UE2 no longer uses the transmission resource, and reselects a new transmission resource. Thus, a hidden node problem of UE2 and UE3 can be solved.

Figure 12:
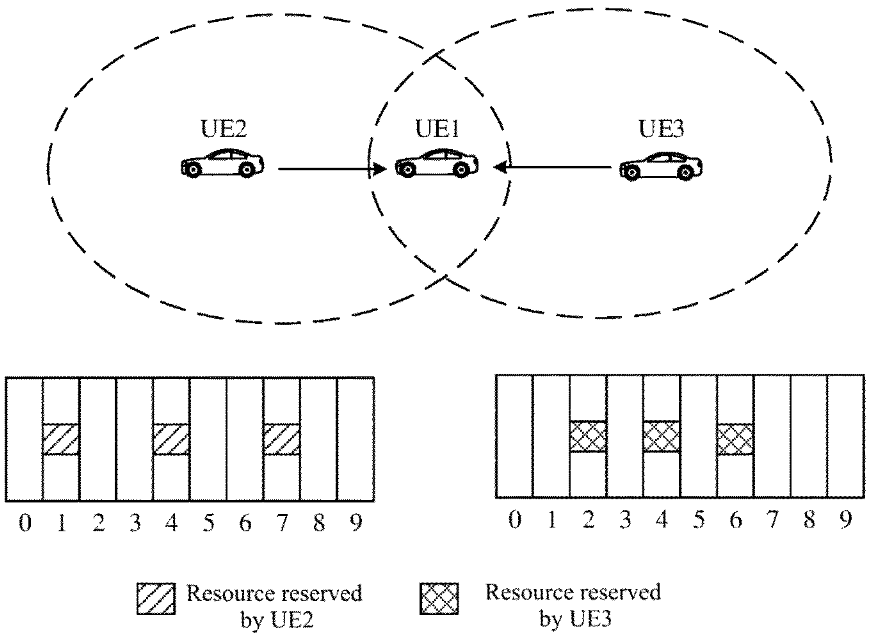
FIG. 12 is another schematic diagram of determining a resource set according to an embodiment of the present application.

As shown in FIG. 12, UE2 selects a transmission resource according to listening, sends sidelink data to UE1, and reserves transmission resources on slots 1/4/7. Since UE2 and UE3 are far away from each other, UE2 cannot detect that UE3 reserves transmission resources on slots 2/4/6. UE1 detects the sidelink data of UE2 and obtains the transmission resources reserved by UE2, and at the same time, UE1 can detect the sidelink data of UE3 and obtain the transmission resources reserved by UE3, i.e., the transmission resources on slots 2/4/6. UE1 determines that a conflict occurs between the transmission resources of UE2 and UE3 on slot 4. Therefore, UE1 sends the conflicting transmission resource, i.e., the transmission resource on slot 4, to UE2, so that UE2 avoids using the transmission resource on this slot, which can avoid a conflict with the transmission resource of UE3, thereby avoiding a hidden node problem.

In an implementation, in example 2, a sidelink RSRP or a sidelink RSSI of the transmission resource in the target resource set exceeds a first threshold value.

For example, when UE1 detects that a resource conflict exists on transmission resource A, and it is assumed that UE1 measures that the sidelink RSRP of UE3 on transmission resource A exceeds the first threshold value, UE1 sends transmission resource A to UE2 to prevent UE2 from selecting transmission resource A. Assuming that UE1 measures that the sidelink RSRP of UE3 on transmission resource A does not exceed the first threshold value, UE1 does not send transmission resource A to UE2. In this case, it may be considered that the interference of UE3 on transmission resource A to UE2 is very low.

It should be noted that, for the description of the first threshold value, reference may be made to the related description in the foregoing example 1, and details will not be repeated here.

In an implementation, in example 2, a transmission resource reserved by the second terminal device includes the transmission resource with the conflict.

For example, when UE1 detects a resource conflict on a certain resource, UE1 sends the target resource set or the first indication information to all the terminals that reserve the transmission resource. For example, in FIG. 12, when UE1 detects that UE2 and UE3 both reserve the transmission resource on slot 4, that is, a resource conflict will occur between UE2 and UE3, UE1 sends a target resource set including the transmission resource to both UE2 and UE3, so that UE2 and UE3 avoid using the transmission resource.

In an implementation, in example 2, the second terminal device is a terminal device with a lowest priority among a plurality of terminal devices that have reserved the transmission resource with the conflict.

For example, when UE1 detects a resource conflict on a certain resource, UE1 sends the target resource set or the first indication information to a terminal with a low priority level among a plurality of terminals that have reserved the transmission resource. For example, in FIG. 12, when UE1 detects that both UE2 and UE3 reserve the transmission resource on slot 4, that is, a resource conflict will occur between UE2 and UE3, and UE1 detects that a priority of UE2 is lower than a priority of UE3, UE1 sends a resource set including the transmission resource to UE2, so that UE2 avoids using the transmission resource, thereby avoiding interference to UE3.

In example 3, a transmission resource in the target resource set includes a transmission resource overlapping with a transmission resource of a receiving terminal in a time domain.

For example, UE1 sends the target resource set to UE2. When UE1 is a receiving terminal for sidelink data sent by UE2, an element in the target resource set includes a transmission resource overlapping with a transmission resource of UE1 in the time domain. When UE3 is a receiving terminal for the sidelink data sent by UE2, the element in the target resource set includes a transmission resource overlapping with a transmission resource of UE3 in the time domain.

In an implementation, in example 3, a transmission resource in the target resource set is a transmission resource used or reserved by the receiving terminal.

For example, when UE1 is a receiving terminal for data sent by UE2, if UE2 simultaneously sends data in a slot where UE1 sends data, UE1 cannot receive the data sent by UE2 due to the half-duplex constraint. Therefore, UE1 can send transmission resources used or reserved by UE1 (namely, resources to perform data transmission) to UE2, and when performing resource selection, UE2 avoids using resources in slots where these transmission resources are located, thereby avoiding the half-duplex problem.

Figure 13:
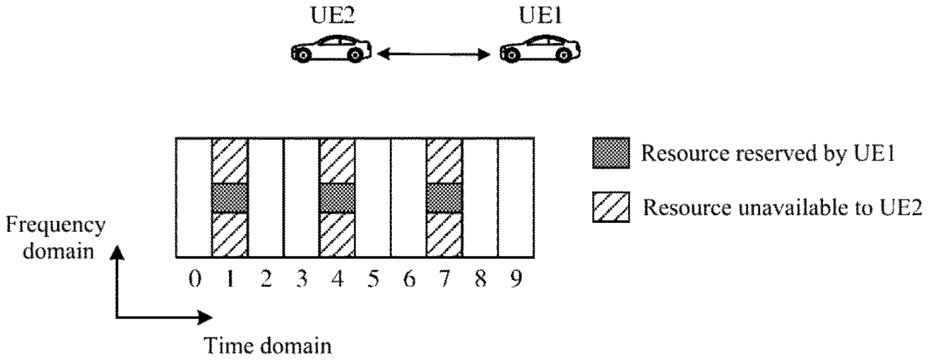
FIG. 13 is still another schematic diagram of determining a resource set according to an embodiment of the present application.

For example, as shown in FIG. 13, unicast communication is performed between UE1 and UE2. UE1 reserves transmission resources on slots 1/4/7, and sends a resource set including the three transmission resources to UE2. When performing resource selection, UE2 avoids using transmission resources on slots where the three transmission resources are located, that is, UE2 avoids selecting transmission resources on slots 1/4/7, thereby avoiding the half-duplex problem.

Figure 14:
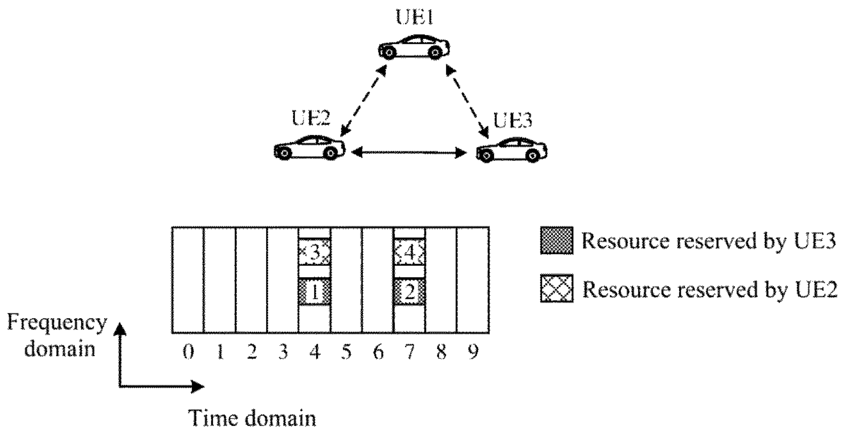
FIG. 14 is still another schematic diagram of determining a resource set according to an embodiment of the present application.

For another example, as shown in FIG. 14, unicast communication is performed between UE2 and UE3. UE1 may detect the sidelink data sent by UE2 and UE3, and learn that UE2 reserves transmission resources 3 and 4 on slots 4/7, and UE3 reserves transmission resources 1 and 2 on slots 4/7. Furthermore, according to address information included in SCI, it can be determined that data communication is performed between UE2 and UE3. UE1 sends a resource set including transmission resources 3 and 4 to UE2, and when performing resource selection, UE2 avoids using transmission resources on the slots where the two transmission resources are located. That is, UE2 avoids selecting the transmission resources on slots 4/7, thereby avoiding the half-duplex problem. Or, UE1 sends a resource set including the transmission resources 1 and 2 to UE3, and when performing resource selection, UE3 avoids using the transmission resources on the slots where the two transmission resources are located. That is, UE3 avoids selecting the transmission resources on slots 4/7, thereby avoiding the half-duplex problem.

In an implementation, in example 3, a transmission resource in the target resource set is information about a slot where a transmission resource used or reserved by the receiving terminal is located.

For example, as shown in the foregoing FIG. 13, the unicast communication is performed between UE2 and UE1, where UE1 is a receiving-end for sidelink data sent by UE2. UE1 uses or reserves transmission resources on slots 1/4/7, and sends information about slots 1/4/7 to UE2. UE2 avoids using the transmission resources on the three slots.

For another example, as shown in the foregoing FIG. 14, the unicast communication is performed between UE2 and UE3. UE1 may detect the sidelink data sent by UE2 and UE3, and learn that UE2 reserves the transmission resources 3 and 4 on slots 4/7, and UE3 reserves the transmission resources 1 and 2 on slots 4/7. Furthermore, according to the address information included in the SCI, it can be determined that data communication is performed between UE2 and UE3. UE1 sends information about slots including the transmission resources 3 and 4, i.e., slots 4/7, to UE2. When performing resource selection, UE2 avoids using the transmission resources on the two slots. That is, UE2 avoids selecting the transmission resources on slots 4/7, thereby avoiding the half-duplex problem. Or, UE1 sends information about slots including the transmission resources 1 and 2, i.e., slots 4/7, to UE3. When performing resource selection, UE3 avoids using the transmission resources on the two slots. That is, UE3 avoids selecting the transmission resources on slots 4/7, thereby avoiding the half-duplex problem.

In an implementation, in example 3, the receiving terminal is a receiving terminal for the second terminal device. For example, the second terminal device is a sending end, and the receiving terminal (for example, the third terminal device or the first terminal device) is a receiving device for the second terminal device.

In an implementation, in example 3, a priority of the second terminal device is lower than a priority of sidelink data to be sent by the receiving terminal. For example, if both the sending end (the second terminal) and the receiving device have data to be sent, and the priority of the sending end is lower than the priority of the receiving end, indication information is sent to the sending end to indicate transmission resources to be used by the receiving device, so as to prevent the sending-end device from selecting these transmission resources.

In example 4, a transmission resource in the target resource set includes information about a slot occupied by at least one PSFCH to be received by the first terminal device; or, a transmission resource in the target resource set includes a first slot, a PSFCH corresponding to a PSSCH transmitted in the first slot is transmitted in a second slot, and the first terminal device has at least one PSFCH to be received in the second slot.

It should be noted that, when sidelink feedback is activated, the receiving terminal needs to send sidelink feedback information to the sending terminal according to a state of the received sidelink data, which is carried in a PSFCH channel. In order to reduce the overhead of the PSFCH channel, it is defined that one slot of every N slots includes a PSFCH transmission resource. That is, a period of a sidelink feedback resource is N slots, where N=1, 2, 4, and the parameter N is preconfigured or configured by the network. When the terminal receives the PSSCH at slot n, a corresponding PSFCH channel thereof is transmitted in the first slot including a PSFCH transmission resource after slot n+k, where k is 2 or 3.

Figure 15:
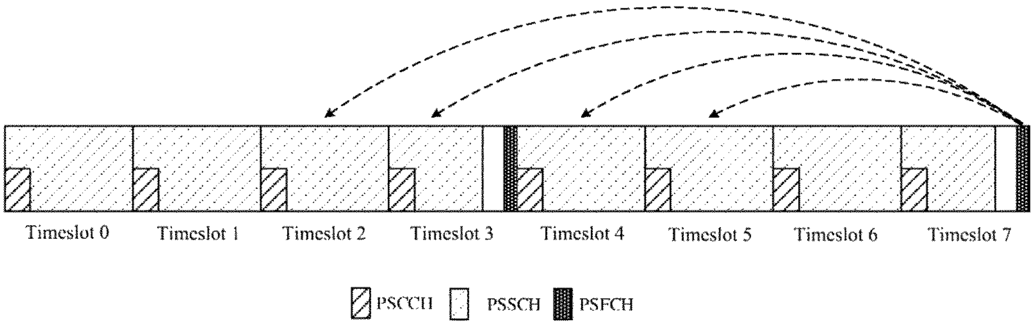
FIG. 15 is still another schematic diagram of determining a resource set according to an embodiment of the present application.

For example, as shown in FIG. 15, k=2, N=4, and feedback information of PSSCHs transmitted in slots 2, 3, 4, and 5 is all transmitted in slot 7. Thus, slots {2, 3, 4, 5} may be regarded as a slot set, and a PSFCH corresponding to the PSSCHs transmitted in the slot set is in the same slot.

It should be noted that, when UE1 needs to receive a PSFCH in a slot, UE1 cannot send a PSFCH in the slot. Therefore, if UE1 can determine that a PSFCH needs to be received in a slot, UE1 may send the slot information to UE2. When performing resource selection, UE2 avoids selecting transmission resources in the PSSCH slot set corresponding to the PSFCH slot.

For example, in the foregoing FIG. 15, if UE1 needs to receive a PSFCH in slot 7, for example, UE1 sends a PSSCH in slot 2 to UE2 (or other terminals, e.g., UE3), and UE2 (or UE3) needs to send a PSFCH in slot 7, that is, UE1 needs to receive the PSFCH in slot 7, at this time, UE1 cannot send a PSFCH in slot 7. Therefore, UE1 can send information about slot 7, i.e., the slot required to receive the PSFCH, to UE2. When performing resource selection, UE2 avoids selecting transmission resources on slots of PSSCHs corresponding to slot 7, i.e., on slots 2/3/4/5.

In an implementation, in example 4, the first terminal device sends second priority information to the second terminal device, where the second priority information is a priority corresponding to the at least one PSFCH to be received, or the second priority information is a highest priority corresponding to the at least one PSFCH to be received. Correspondingly, the second terminal device receives the second priority information sent by the first terminal device.

It should be noted that, the terminal device needs to send and receive PSFCH channels at the same time in a certain slot. The terminal device may determine whether to send a PSFCH or receive a PSFCH according to channel priorities of sending a PSFCH and receiving a PSFCH. If a priority of a PSFCH to be sent is higher, then the PSFCH is sent; and if a priority of a PSFCH to be received is higher, then the PSFCH is received. For example, UE1 has a PSFCH to be received in slot A. UE1 sends slot information of the PSFCH to be received to UE2, and sends priority information of the PSFCH to be received in slot A to UE2. UE2 may determine according to the priority information whether data transmission needs to be performed in a PSSCH slot corresponding to slot A. For example, if a priority of sidelink data to be sent by UE2 is higher than a priority sent by UE1 to UE2, UE2 may select the PSSCH slot corresponding to slot A to perform data transmission. At this time, since UE1 receives the sidelink data of UE2, and the priority corresponding to the sidelink data (namely, the priority of the PSFCH for the sidelink data) is higher than the priority of the PSFCH to be received, UE1 will send the PSFCH for the PSSCH to UE2, and not receive the PSFCH. If the priority of the sidelink data to be sent by UE2 is lower than the priority sent by UE1 to UE2, UE2 will not select the PSSCH slot corresponding to slot A to perform data transmission. This is because even if UE2 selects the PSSCH slot corresponding to slot A to perform data transmission, since the priority corresponding to the sidelink data (namely, the priority of the PSFCH for the sidelink data) is lower than the priority of the PSFCH to be received, UE1 will receive the PSFCH and cancel the sending of the PSFCH for the PSSCH to UE2.

In example 5, a transmission resource in the target resource set includes information about a slot occupied by at least one PSFCH to be sent by the first terminal device; or, a transmission resource in the target resource set includes a third slot, a PSFCH corresponding to a PSSCH transmitted in the third slot is transmitted in a fourth slot, and the first terminal device has at least one PSFCH to be sent in the fourth slot.

It should be noted that, a quantity of PSFCH channels that can be simultaneously sent by the terminal device depends on capability of the terminal. According to different terminal capabilities, the quantity of PSFCH channels supported to be sent simultaneously is also different. For example, the terminal device may send N (N=1/2/4/8) PSFCH channels simultaneously. When PSFCHs to be sent by UE1 in slot A reach a maximum value, UE1 may send information about slot A to UE2. When performing resource selection, UE2 avoids selecting transmission resources in a PSSCH slot set corresponding to slot A.

For example, in the foregoing FIG. 15, if UE1 at most supports simultaneous sending of two PSFCH channels, when a quantity of PSFCH channels to be sent by UE1 in slot 7 reaches or exceeds two, UE1 sends information about slot 7 to UE2. When performing resource selection, UE2 avoids selecting transmission resources on PSSCH slots corresponding to the sidelink feedback slot 7, i.e., on slots 2/3/4/5.

In an implementation, in example 5, the first terminal device sends second indication information to the second terminal device, where the second indication information is used for indicating a quantity of PSFCHs in the at least one PSFCH to be sent, or the second indication information is used for indicating a quantity of PSFCHs that are capable of being further sent by the first terminal device in a slot of the at least one PSFCH to be sent. Correspondingly, the second terminal device receives the second indication information sent by the first terminal device.

It should be noted that, if UE1 and UE2 have exchanged capability information of the terminals when establishing a unicast link, UE2 can learn a quantity of PSFCHs simultaneously sent by UE1. Therefore, UE2 can determine whether UE1 can further send a PSFCH channel on slot A, in combination with the maximum quantity of PSFCHs which can be supported to be sent by UE1 and the quantity of PSFCHs to be sent on slot A by UE1, so as to decide whether the transmission resources on the PSSCH slot corresponding to slot A can be selected.

For example, UE1 supports sending at most four PSFCH channels simultaneously, and has sent its capability information to UE2 when a unicast communication link is established with UE2. In the foregoing FIG. 15, UE1 determines that two PSFCH channels are to be sent on slot 7, and then UE2 may determine that UE1 can further send two PSFCH channels on slot 7. Therefore, UE2 transmits at most two independent data blocks in PSSCH slots corresponding to slot 7, i.e., slots 2/3/4/5. If each data block is not retransmitted, UE2 selects at most two slots for data transmission. If PSSCH retransmission is supported, UE2 transmits at most two independent data blocks in slots 2/3/4/5, and one or more retransmissions may be supported for each data block. If the first data block is sent using slots 2/3 and the second data block is sent using slots 4/5, when UE1 receives PSSCHs, since the same data block is sent in slots 2/3, the PSFCH only needs to be fed back once. The same data block is sent in slots 4/5, and the PSFCH also only needs to be fed back once.

In an implementation, in example 5, the first terminal device sends third priority information to the second terminal device, where the third priority information is a priority corresponding to the at least one PSFCH to be sent, or the third priority information is a highest priority corresponding to the at least one PSFCH to be sent. Correspondingly, the second terminal device receives the third priority information sent by the first terminal device.

It should be noted that, UE2 may determine, according to the priority information sent by UE1 and a priority of data currently to be transmitted, whether it is necessary to select a transmission resource in a PSSCH slot corresponding to a PSFCH slot. If the priority of the data to be transmitted is higher than the priority sent by UE1 to UE2, UE2 may select the PSSCH slot corresponding to the PSFCH slot to perform data transmission. In this case, since UE1 receives sidelink data of UE2, and a priority corresponding to the sidelink data (namely, a priority of the PSFCH for the sidelink data) is higher than a priority of the PSFCH to be sent, if a quantity of PSFCH channels sent simultaneously does not exceed the capability of UE1, UE1 will send a plurality of PSFCH channels simultaneously. If the quantity of PSFCH channels sent simultaneously exceeds the capability of UE1, and the priority of the PSFCH channel to be sent by UE1 to UE2 is higher, UE1 will send the PSFCH for the PSSCH to UE2, and discard PSFCHs sent to other terminals. If the priority of the sidelink data to be sent by UE2 is lower than the priority sent by UE1 to UE2, UE2 does not select the PSSCH slot corresponding to the PSFCH slot to perform data transmission. This is because even if UE2 selects the PSSCH slot corresponding to the PSFCH slot to perform data transmission, since the priority corresponding to the sidelink data (namely, the priority of the PSFCH for the sidelink data) is lower than priorities of PSFCHs to be sent by UE1 to other terminals, UE1 will send the PSFCHs to other terminals, and will not send the PSFCH for the PSSCH to UE2.

Therefore, in the embodiments of the present application, the first terminal device sends the target resource set to the second terminal device, so that the second terminal device can determine a candidate transmission resource according to the target resource set, and thus the second terminal device can avoid problems such as a hidden node, half-duplex and the like occurring in resource selection, thereby improving the reliability of the resource selection. Or, the first terminal device sends the first indication information to the second terminal device according to the target resource set, so that the second terminal device can perform resource reselection according to the first indication information, and thus the second terminal device can avoid problems such as a hidden node, half-duplex and the like occurring in resource selection, thereby improving the reliability of the resource selection.

The method embodiments of the present application are described in detail with reference to FIG. 10 to FIG. 15. The apparatus embodiments of the present application are described in detail with reference to FIG. 16 to FIG. 20. It should be understood that, the apparatus embodiments correspond to the method embodiments, and for similar description, reference may be made to the method embodiments.

Figure 16:
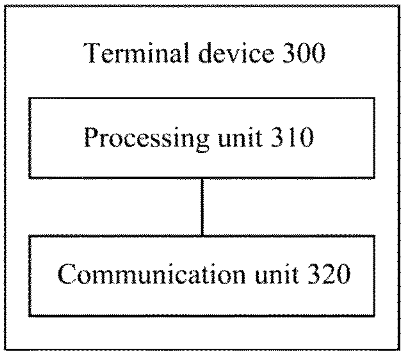
FIG. 16 is a schematic block diagram of a terminal device according to an embodiment of the present application.

FIG. 16 is a schematic block diagram of a terminal device 300 according to an embodiment of the present application. As shown in FIG. 16, the terminal device 300 is a first terminal device, and the terminal device 300 includes:

a processing unit 310, configured to determine a target resource set;

a communication unit 320, configured to send the target resource set to a second terminal device, or configured to send first indication information to a second terminal device according to the target resource set;

where the target resource set is used for the second terminal device to determine a candidate transmission resource, and the first indication information is used for indicating the second terminal device to perform resource reselection.

In an implementation, that the target resource set is used for the second terminal device to determine the candidate transmission resource includes:

the target resource set is used for the second terminal device to determine a resource which needs to be excluded.

In an implementation, the processing unit 310 is specifically configured to:

determine the target resource set according to first information;

where the first information includes at least one of the following:

a sidelink reference signal received power (RSRP) and/or a sidelink received signal strength indicator (RSSI) that is detected by the first terminal device;

a sidelink RSRP and/or a sidelink RSSI that is predicted by the first terminal device;

a transmission resource that is detected by the first terminal device and conflicts with a transmission resource reserved by the second terminal device;

a time domain resource occupied by data to be sent;

a time domain resource occupied by a physical sidelink feedback channel (PSFCH) to be received;

a time domain resource occupied by a physical sidelink shared channel (PSSCH) corresponding to a time domain resource occupied by a PSFCH to be received;

a time domain resource occupied by a PSFCH to be sent;

a time domain resource occupied by a PSSCH corresponding to a time domain resource occupied by a PSFCH to be sent.

In an implementation, a transmission resource in the target resource set is a transmission resource with a conflict.

In an implementation, a transmission resource reserved by the second terminal device includes the transmission resource with the conflict.

In an implementation, the second terminal device is a terminal device with a lowest priority among a plurality of terminal devices that have reserved the transmission resource with the conflict.

In an implementation, a sidelink RSRP or a sidelink RSSI of a transmission resource in the target resource set exceeds a first threshold value.

In an implementation, the sidelink RSRP of the transmission resource in the target resource set is a predicted sidelink RSRP, or the sidelink RSSI of the transmission resource in the target resource set is a predicted sidelink RSSI.

In an implementation, the first threshold value is preconfigured or determined in specification, or the first threshold value is configured by a network device, or the first threshold value is configured by a third terminal device.

In an implementation, the first threshold value is determined according to sidelink information sent by the second terminal device, or, the first threshold value is determined by the first terminal device.

In an implementation, when the first threshold value is determined by the first terminal device, the communication unit 320 is further configured to send the first threshold value to the second terminal device.

In an implementation, the first threshold value is a value related to first priority information, or the first threshold value is determined according to first priority information.

In an implementation, the first priority information includes at least one of the following:

a priority carried in sidelink control information (SCI), a priority of a service corresponding to sidelink data, a priority of a logic channel corresponding to sidelink data.

In an implementation, the communication unit 310 is further configured to send the first priority information corresponding to the first threshold value to the second terminal device.

In an implementation, the first priority information is obtained from the second terminal device, or the first priority information is obtained from configuration information of a resource pool.

In an implementation, a transmission resource in the target resource set includes a transmission resource overlapping with a transmission resource of a receiving terminal in a time domain.

In an implementation, the transmission resource in the target resource set is a transmission resource used or reserved by the receiving terminal.

In an implementation, the transmission resource in the target resource set is information about a slot where a transmission resource used or reserved by the receiving terminal is located.

In an implementation, the receiving terminal is a receiving terminal for the second terminal device.

In an implementation, a priority of the second terminal device is lower than a priority of sidelink data to be sent by the receiving terminal.

In an implementation, a transmission resource in the target resource set includes information about a slot occupied by at least one PSFCH to be received by the first terminal device.

In an implementation, a transmission resource in the target resource set includes a first slot, a PSFCH corresponding to a physical downlink shared channel (PSSCH) transmitted in the first slot is transmitted in a second slot, and the first terminal device has at least one PSFCH to be received in the second slot.

In an implementation, the communication unit 320 is further configured to send second priority information to the second terminal device, where the second priority information is a priority corresponding to the at least one PSFCH to be received, or the second priority information is a highest priority corresponding to the at least one PSFCH to be received.

In an implementation, a transmission resource in the target resource set includes information about a slot occupied by at least one PSFCH to be sent by the first terminal device.

In an implementation, a transmission resource in the target resource set includes a third slot, a PSFCH corresponding to a PSSCH transmitted in the third slot is transmitted in a fourth slot, and the first terminal device has at least one PSFCH to be sent in the fourth slot.

In an implementation, the communication unit 320 is further configured to send second indication information to the second terminal device, where the second indication information is used for indicating a quantity of PSFCHs in the at least one PSFCH to be sent, or the second indication information is used for indicating a quantity of PSFCHs that are capable of being further sent by the first terminal device in a slot of the at least one PSFCH to be sent.

In an implementation, the communication unit 320 is further configured to send third priority information to the second terminal device, where the third priority information is a priority corresponding to the at least one PSFCH to be sent, or the third priority information is a highest priority corresponding to the at least one PSFCH to be sent.

In an implementation, the first terminal device is a receiving device of sidelink data sent by the second terminal device; or, the first terminal device is a terminal device within a communication group where the second terminal device is located.

In an implementation, the communication unit may be a communication interface or a transceiver, or an input/output interface of a communication chip or a system on chip. The processing unit may be one or more processors.

It should be understood that, the terminal device 300 according to the embodiments of the present application may correspond to the first terminal device in the method embodiments of the present application, and the foregoing and other operations and/or functions of the units in the terminal device 300 are respectively intended to implement the corresponding processes of the first terminal device in the method 200 shown in FIG. 10, which will not be repeated here for brevity.

Figure 17:
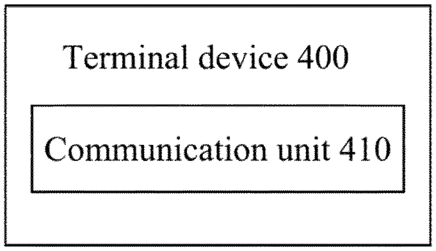
FIG. 17 is a schematic block diagram of a terminal device according to an embodiment of the present application.

FIG. 17 is a schematic block diagram of a terminal device 400 according to an embodiment of the present application. As shown in FIG. 17, the terminal device 400 is a second terminal device, and the terminal device 400 includes:

a communication unit 410, configured to receive a target resource set sent by a first terminal device, or receive first indication information sent by a first terminal device according to a target resource set;

where the target resource set is used for the second terminal device to determine a candidate transmission resource, and the first indication information is used for indicating the second terminal device to perform resource reselection.

In an implementation, that the target resource set is used for the second terminal device to determine the candidate transmission resource includes:

the target resource set is used for the second terminal device to determine a resource which needs to be excluded.

In an implementation, the target resource set is determined by the first terminal device according to first information;

where the first information includes at least one of the following:

a sidelink reference signal received power (RSRP) and/or a sidelink received signal strength indicator (RSSI) that is detected by the first terminal device;

a sidelink RSRP and/or a sidelink RSSI that is predicted by the first terminal device;

a transmission resource that is detected by the first terminal device and conflicts with a transmission resource reserved by the second terminal device;

a time domain resource occupied by data to be sent;

a time domain resource occupied by a physical sidelink feedback channel (PSFCH) to be received;

a time domain resource occupied by a physical sidelink shared channel (PSSCH) corresponding to a time domain resource occupied by a PSFCH to be received;

a time domain resource occupied by a PSFCH to be sent;

a time domain resource occupied by a PSSCH corresponding to a time domain resource occupied by a PSFCH to be sent.

In an implementation, a transmission resource in the target resource set is a transmission resource with a conflict.

In an implementation, a transmission resource reserved by the second terminal device includes the transmission resource with the conflict.

In an implementation, the second terminal device is a terminal device with a lowest priority among a plurality of terminal devices that have reserved the transmission resource with the conflict.

In an implementation, a sidelink RSRP or a sidelink RSSI of a transmission resource in the target resource set exceeds a first threshold value.

In an implementation, the sidelink RSRP of the transmission resource in the target resource set is a predicted sidelink RSRP, or the sidelink RSSI of the transmission resource in the target resource set is a predicted sidelink RSSI.

In an implementation, the first threshold value is preconfigured or determined in specification, or the first threshold value is configured by a network device, or the first threshold value is configured by a third terminal device.

In an implementation, the first threshold value is determined according to sidelink information sent by the second terminal device; or, the first threshold value is determined by the first terminal device.

In an implementation, when the first threshold is determined by the first terminal device, the communication unit 410 is further configured to receive the first threshold value sent by the first terminal device.

In an implementation, the first threshold value is a value related to first priority information, or the first threshold value is determined according to first priority information.

In an implementation, the first priority information includes at least one of the following:

a priority carried in sidelink control information (SCI), a priority of a service corresponding to sidelink data, a priority of a logic channel corresponding to sidelink data.

In an implementation, the communication unit 410 is further configured to receive the first priority information that corresponds to the first threshold value and is sent by the first terminal device.

In an implementation, the first priority information is obtained from the second terminal device, or the first priority information is obtained from configuration information of a resource pool.

In an implementation, a transmission resource in the target resource set includes a transmission resource overlapping with a transmission resource of a receiving terminal in a time domain.

In an implementation, the transmission resource in the target resource set is a transmission resource used or reserved by the receiving terminal.

In an implementation, a transmission resource in the target resource set is information about a slot where a transmission resource used or reserved by the receiving terminal is located.

In an implementation, the receiving terminal is a receiving terminal for the second terminal device.

In an implementation, a priority of the second terminal device is lower than a priority of sidelink data to be sent by the receiving terminal.

In an implementation, a transmission resource in the target resource set includes information about a slot occupied by at least one PSFCH to be received by the first terminal device.

In an implementation, a transmission resource in the target resource set includes a first slot, a PSFCH corresponding to a physical downlink shared channel (PSSCH) transmitted in the first slot is transmitted in a second slot, and the first terminal device has at least one PSFCH to be received in the second slot.

In an implementation, the communication unit 410 is further configured to receive second priority information sent by the first terminal device, where the second priority information is a priority corresponding to the at least one PSFCH to be received, or the second priority information is a highest priority corresponding to the at least one PSFCH to be received.

In an implementation, a transmission resource in the target resource set includes information about a slot occupied by at least one PSFCH to be sent by the first terminal device.

In an implementation, a transmission resource in the target resource set includes a third slot, a PSFCH corresponding to a PSSCH transmitted in the third slot is transmitted in a fourth slot, and the first terminal device has at least one PSFCH to be sent in the fourth slot.

In an implementation, the communication unit 410 is further configured to receive second indication information sent by the first terminal device, where the second indication information is used for indicating a quantity of PSFCHs in the at least one PSFCH to be sent, or the second indication information is used for indicating a quantity of PSFCHs that are capable of being further sent by the first terminal device in a slot of the at least one PSFCH to be sent.

In an implementation, the communication unit 410 is further configured to receive third priority information sent by the first terminal device, where the third priority information is a priority corresponding to the at least one PSFCH to be sent, or the third priority information is a highest priority corresponding to the at least one PSFCH to be sent.

In an implementation, the first terminal device is a receiving device of sidelink data sent by the second terminal device; or, the first terminal device is a terminal device within a communication group where the second terminal device is located.

In an implementation, the communication unit may be a communication interface or a transceiver, or an input/output interface of a communication chip or a system on chip. The processing unit may be one or more processors.

It should be understood that, the terminal device 400 according to the embodiments of the present application may correspond to the second terminal device in the method embodiments of the present application, and the foregoing and other operations and/or functions of the units in the terminal device 400 are respectively intended to implement the corresponding processes of the second terminal device in the method 200 shown in FIG. 10, which will not be repeated here for brevity.

Figure 18:
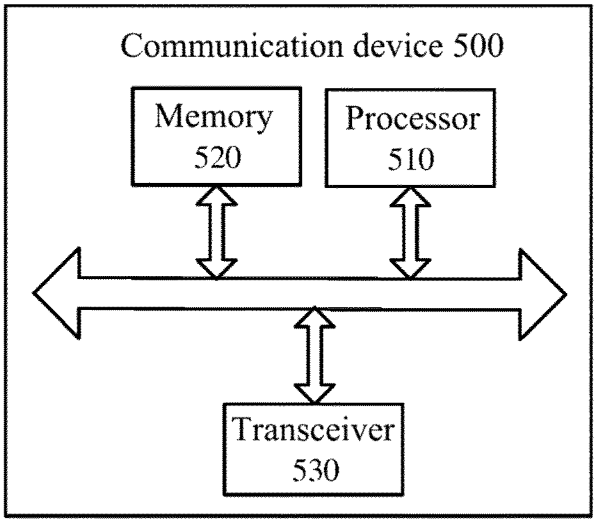
FIG. 18 is a schematic block diagram of a communication device according to an embodiment of the present application.

FIG. 18 is a schematic structural diagram of a communication device 500 according to an embodiment of the present application. The communication device 500 shown in FIG. 18 includes a processor 510. The processor 510 can call and run a computer program from a memory to implement the method in the embodiments of the present application.

In an implementation, as shown in FIG. 18, the communication device 500 may further include a memory 520, where the processor 510 can call and run a computer program from the memory 520 to implement the method in the embodiments of the present application.

The memory 520 may be a separate component independent of the processor 510, and may also be integrated in the processor 510.

In an implementation, as shown in FIG. 18, the communication device 500 may further include a transceiver 530. The processor 510 can control the transceiver 530 to communicate with other devices, and specifically, can send information or data to other devices, or receive information or data sent by other devices.

The transceiver 530 may include a transmitter and a receiver. The transceiver 530 may further include an antenna, and a quantity of antennas may be one or more.

In an implementation, the communication device 500 may specifically be the first terminal device in the embodiments of the present application, and the communication device 500 may implement corresponding processes implemented by the first terminal device in the methods in the embodiments of the present application, which will not be repeated here for brevity.

In an implementation, the communication device 500 may specifically be the second terminal device in the embodiments of the present application, and the communication device 500 may implement corresponding processes implemented by the second terminal device in the methods in the embodiments of the present application, which will not be repeated here for brevity.

Figure 19:
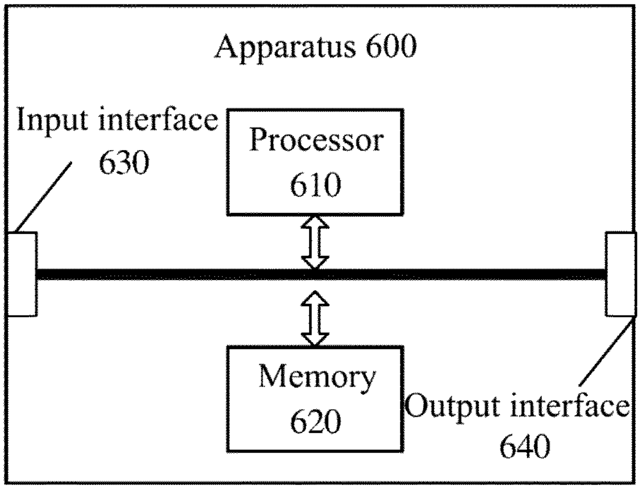
FIG. 19 is a schematic block diagram of an apparatus according to an embodiment of the present application.

FIG. 19 is a schematic structural diagram of an apparatus according to an embodiment of the present application. The apparatus 600 shown in FIG. 19 includes a processor 610. The processor 610 can call and run a computer program from a memory to implement the method in the embodiments of the present application.

In an implementation, as shown in FIG. 19, the apparatus 600 may further include a memory 620, where the processor 610 can call and run a computer program from the memory 620 to implement the method in the embodiments of the present application.

The memory 620 may be a separate component independent of the processor 610, and may also be integrated in the processor 610.

In an implementation, the apparatus 600 may further include an input interface 630. The processor 610 can control the input interface 630 to communicate with other devices or chips, and specifically, can obtain information or data sent by other devices or chips.

In an implementation, the apparatus 600 may further include an output interface 640. The processor 610 can control the output interface 640 to communicate with other devices or chips, and specifically, can output information or data to other devices or chips.

In an implementation, the apparatus may be applied to the first terminal device in the embodiments of the present application, and the apparatus can implement corresponding processes implemented by the first terminal device in the methods in the embodiments of the present application, which will not be repeated here for brevity.

In an implementation, the apparatus may be applied to the second terminal device in the embodiments of the present application, and the apparatus may implement corresponding processes implemented by the second terminal device in the methods in the embodiments of the present application, which will not be repeated here for brevity.

In an implementation, the apparatus mentioned in the embodiments of the present application may also be a chip, for example, a system-level chip, a system chip, a chip system, or a system on chip, etc.

Figure 20:
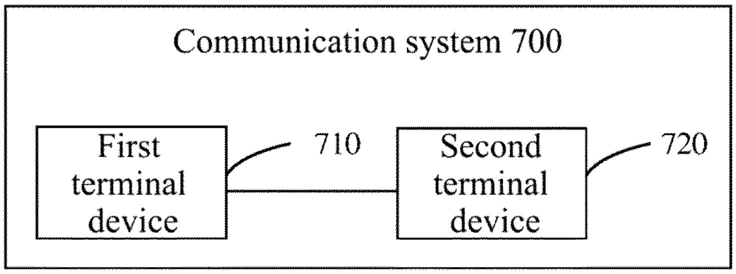
FIG. 20 is a schematic block diagram of a communication system according to an embodiment of the present application.

FIG. 20 is a schematic block diagram of a communication system 700 according to an embodiment of the present application. As shown in FIG. 20, the communication system 700 includes a first terminal device 710 and a second terminal device 720.

The first terminal device 710 can be configured to implement corresponding functions implemented by the first terminal device in the foregoing methods, and the second terminal device 720 can be configured to implement corresponding functions implemented by the second terminal device in the foregoing methods. For brevity, details will not be repeated here.

It should be understood that, the processor in the embodiments of the present application may be an integrated circuit chip, and has a signal processing capability. During implementation, the steps of the foregoing method embodiments may be implemented by an integrated logic circuit of hardware or by instructions in the form of software in the processor. The foregoing processor may be a general-purpose processor, a digital signal processor (DSP), an application specific integrated circuit (ASIC), a field programmable gate array (FPGA), or other programmable logic devices, discrete gates or transistor logic devices, or discrete hardware components. The methods, steps and logic block diagrams disclosed in the embodiments of the present application can be implemented or executed. The general-purpose processor may be a microprocessor, or the processor may also be any conventional processor, etc. Steps of the methods disclosed in combination with the embodiments of the present application may be directly embodied as being implemented by a hardware decoding processor, or implemented by a combination of hardware and software modules in the decoding processor. The software modules may be located in a mature storage medium in the field, such as a random access memory, a flash memory, a read-only memory, a programmable read-only memory, an electrically erasable programmable memory, a register, etc. The storage medium is located in a memory, and the processor reads information from the memory and implements the steps of the above described methods in combination with hardware thereof.

It can be understood that, the memory in the embodiments of the present application may be a volatile memory or a non-volatile memory, or may include both volatile and non-volatile memories. The non-volatile memory may be a read-only memory (ROM), a programmable read-only memory (PROM), an erasable programmable read-only memory EPROM), an electrically erasable programmable read-only memory (EEPROM), or a flash memory. The volatile memory may be a random access memory (RAM), which serves as an external cache. By way of an example but not a limitation, many forms of RAMs are available, such as a static random access memory (static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct rambus random access memory (Direct Rambus RAM, DR RAM). It should be noted that, the memory in the systems and the methods described herein is intended to include, but is not limited to, these and any other suitable types of memories.

It should be understood that, the foregoing memories are illustrative but not limitative description. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM), and a direct rambus random access memory (Direct Rambus RAM, DR RAM), etc. That is to say, the memory in the embodiments of the present application is intended to include, but not limited to, these and any other suitable types of memory.

An embodiment of the present disclosure further provides a computer-readable storage medium for storing a computer program.

In an implementation, the computer-readable storage medium may be applied to the first terminal device in the embodiments of the present application, and the computer program causes a computer to execute corresponding processes implemented by the first terminal device in the methods in the embodiments of the present application. For brevity, details will not be repeated here.

In an implementation, the computer readable storage medium may be applied to the second terminal device in the embodiments of the present application, and the computer program causes a computer to execute corresponding processes implemented by the second terminal device in the methods in the embodiments of the present application. For brevity, details will not be repeated here.

An embodiment of the present application further provides a computer program product including computer program instructions.

In an implementation, the computer program product may be applied to the first terminal device in the embodiments of the present application, and the computer program instructions cause a computer to execute corresponding processes implemented by the first terminal device in the methods in the embodiments of the present application. For brevity, details will not be repeated here.

In an implementation, the computer program product may be applied to the second terminal device in the embodiments of the present application, and the computer program instructions cause a computer to execute corresponding processes implemented by the second terminal device in the methods in the embodiments of the present application. For brevity, details will not be repeated here.

An embodiment of the present disclosure further provides a computer program.

In an implementation, the computer program may be applied to the first terminal device in the embodiments of the present application. When the computer program is run on a computer, the computer is caused to execute corresponding processes implemented by the first terminal device in the methods in the embodiments of the present application. For brevity, details will not be repeated here.

In an implementation, the computer program may be applied to the second terminal device in the embodiments of the present application. When the computer program is run on a computer, the computer is caused to execute corresponding processes implemented by the second terminal device in the methods in the embodiments of the present application. For brevity, details will not be repeated here.

Persons of ordinary skill in the art may be aware that, units and algorithm steps in the examples described in the embodiments disclosed herein may be implemented by electronic hardware, or a combination of computer software and electronic hardware. Whether the functions are executed by hardware or software depends on specific applications and design constraint conditions of the technical solutions. Persons skilled in the art may use a different method to implement the described functions for each specific application, but the implementation shall not be considered as going beyond the scope of the present application.

It may be clearly understood by persons skilled in the art that for the purpose of convenient and brief description, for a detailed working process of the foregoing systems, apparatuses and units, reference may be made to a corresponding process in the foregoing method embodiments, and details will not be repeated here.

In the several embodiments provided in the present application, it should be understood that the disclosed systems, apparatuses and methods may be implemented in other manners. For example, the apparatus embodiments described above are merely illustrative. For example, a division of the units is merely a division of logical functions, and there may be other division manners in actual implementations. For example, a plurality of units or components may be combined or integrated into another system, or some features may be ignored or not executed. In addition, the displayed or discussed mutual coupling or direct coupling or communication connections may be indirect coupling or communication connections through some interfaces, apparatuses or units, which may be in electronic, mechanical, or other forms.

The units described as separate components may or may not be physically separate, and components displayed as units may or may not be physical units. That is, they may be located in one place, or may be distributed on a plurality of network elements. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

If the functions are implemented in the form of software functional units and sold or used as an independent product, the functions may be stored in a computer-readable storage medium. For such understanding, the technical solution of the present application essentially, or the part contributing to the prior art, or a part of the technical solution may be embodied in the form of a software product. The computer software product is stored in a storage medium and includes several instructions for causing a computer device (which may be a personal computer, a server, a network device, or the like) to perform all or a part of the steps of the methods described in the embodiments of the present application. The foregoing storage medium includes: any medium that can store program codes, such as a USB flash disk, a removable hard disk, a read-only memory (ROM), a random access memory (RAM), a magnetic disk, an optical disk, etc.

The foregoing descriptions are merely specific implementations of the present application, but are not intended to limit the protection scope of the present application. Any variation or replacement readily figured out by persons skilled in the art within the technical scope disclosed in the present application shall belong to the protection scope of the present application. Therefore, the protection scope of the present application shall be subject to the protection scope of the claims.

What is claimed is:

1. A method for determining a resource set, comprising:

determining, by a first terminal device, a target resource set, wherein a sidelink RSRP or a sidelink RSSI of each transmission resource in the target resource set exceeds a first threshold value; and sending, by the first terminal device, the target resource set to a second terminal device, or, sending, by the first terminal device, first indication information to a second terminal device according to the target resource set;

wherein the target resource set is used for the second terminal device to determine a candidate transmission resource, and the first indication information is used for indicating the second terminal device to perform resource reselection;

wherein that the target resource set is used for the second terminal device to determine the candidate transmission resource comprises:

the target resource set is used for the second terminal device to determine a resource which needs to be excluded;

wherein a transmission resource in the target resource set is a transmission resource with a conflict;

wherein the second terminal device is a terminal device with a lowest priority among a plurality of terminal devices that have reserved the transmission resource with the conflict;

wherein the first threshold value is a value related to first priority information, or the first threshold value is determined according to first priority information.

2. The method according to claim 1, wherein determining, by the first terminal device, the target resource set comprises:

determining, by the first terminal device, the target resource set according to first information;

wherein the first information comprises at least one of the following:

a sidelink reference signal received power (RSRP) and/or a sidelink received signal strength indicator (RSSI) that is detected by the first terminal device;

a sidelink RSRP and/or a sidelink RSSI that is predicted by the first terminal device;

a transmission resource that is detected by the first terminal device and conflicts with a transmission resource reserved by the second terminal device;

a time domain resource occupied by data to be sent;

a time domain resource occupied by a physical sidelink feedback channel (PSFCH) to be received;

a time domain resource occupied by a physical sidelink shared channel (PSSCH) corresponding to a time domain resource occupied by a PSFCH to be received;

a time domain resource occupied by a PSFCH to be sent;

a time domain resource occupied by a PSSCH corresponding to a time domain resource occupied by a PSFCH to be sent.

3. The method according to claim 1, wherein a transmission resource reserved by the second terminal device comprises the transmission resource with the conflict.

4. The method according to claim 1, wherein the sidelink RSRP of the transmission resource in the target resource set is a predicted sidelink RSRP, or the sidelink RSSI of the transmission resource in the target resource set is a predicted sidelink RSSI.

5. The method according to claim 1, wherein, the first threshold value is preconfigured or determined in specification, or the first threshold value is configured by a network device, or the first threshold value is configured by a third terminal device; or, the first threshold value is determined according to sidelink information sent by the second terminal device; or, the first threshold value is determined by the first terminal device.

6. The method according to claim 1, wherein the first priority information comprises at least one of the following:

a priority carried in sidelink control information (SCI), a priority of a service corresponding to sidelink data, a priority of a logic channel corresponding to sidelink data.

7. The method according to claim 1, wherein, the first priority information is obtained from the second terminal device, or the first priority information is obtained from configuration information of a resource pool.

8. The method according to claim 1, wherein a transmission resource in the target resource set comprises a transmission resource overlapping with a transmission resource of a receiving terminal in a time domain.

9. The method according to claim 8, wherein the transmission resource in the target resource set is a transmission resource used or reserved by the receiving terminal.

10. The method according to claim 8, wherein the transmission resource in the target resource set is information about a slot where a transmission resource used or reserved by the receiving terminal is located.

11. The method according to claim 8, wherein the receiving terminal is a receiving terminal for the second terminal device.

12. The method according to claim 1, wherein, the first terminal device is a receiving device of sidelink data sent by the second terminal device; or, the first terminal device is a terminal device within a communication group where the second terminal device is located.

13. A method for determining a resource set, comprising:

receiving, by a second terminal device, a target resource set sent by a first terminal device, or, receiving, by a second terminal device, first indication information sent by a first terminal device according to a target resource set, wherein a sidelink RSRP or a sidelink RSSI of each transmission resource in the target resource set exceeds a first threshold value;

wherein the target resource set is used for the second terminal device to determine a candidate transmission resource, and the first indication information is used for indicating the second terminal device to perform resource reselection;

wherein that the target resource set is used for the second terminal device to determine the candidate transmission resource comprises:

the target resource set is used for the second terminal device to determine a resource which needs to be excluded;

wherein a transmission resource in the target resource set is a transmission resource with a conflict;

wherein the second terminal device is a terminal device with a lowest priority among a plurality of terminal devices that have reserved the transmission resource with the conflict;

wherein the first threshold value is a value related to first priority information, or the first threshold value is determined according to first priority information.

14. A terminal device, comprising: a processor and a memory, wherein the memory is configured to store a computer program, and the processor is configured to call and run the computer program stored in the memory, so as to execute the following steps:

determining a target resource set, wherein a sidelink RSRP or a sidelink RSSI of each transmission resource in the target resource set exceeds a first threshold value; and sending the target resource set to a second terminal device, or, sending first indication information to a second terminal device according to the target resource set;

wherein the target resource set is used for the second terminal device to determine a candidate transmission resource, and the first indication information is used for indicating the second terminal device to perform resource reselection;

wherein that the target resource set is used for the second terminal device to determine the candidate transmission resource comprises:

the target resource set is used for the second terminal device to determine a resource which needs to be excluded;

wherein a transmission resource in the target resource set is a transmission resource with a conflict;

wherein the second terminal device is a terminal device with a lowest priority among a plurality of terminal devices that have reserved the transmission resource with the conflict;

wherein the first threshold value is a value related to first priority information, or the first threshold value is determined according to first priority information.

15. A terminal device, comprising: a processor and a memory, wherein the memory is configured to store a computer program, and the processor is configured to call and run the computer program stored in the memory, so as to execute the method according to claim 13.

* * * * *